(12) United States Patent
Horie et al.

(10) Patent No.: US 7,498,803 B2
(45) Date of Patent: Mar. 3, 2009

(54) ROTATION ANGLE DETECTION DEVICE HAVING BEARING SUPPORTED YOKE FIXED TO OBJECT BEING DETECTED

(75) Inventors: Kazuyuki Horie, Nagoya (JP); Tetsuo Hariu, Kariya (JP); Yasunori Kobayashi, Toyohashi (JP); Masao Kano, Gamagori (JP)

(73) Assignee: Denso Corporation, Kariya (JP)

( * ) Notice: Subject to any disclaimer, the term of this patent is extended or adjusted under 35 U.S.C. 154(b) by 147 days.

(21) Appl. No.: 11/594,814

(22) Filed: Nov. 9, 2006

(65) Prior Publication Data

US 2007/0103149 A1    May 10, 2007

(30) Foreign Application Priority Data

Nov. 10, 2005 (JP) .............................. 2005-326517

(51) Int. Cl.
*G01B 7/30* (2006.01)
(52) U.S. Cl. ................. 324/207.25; 324/207.2
(58) Field of Classification Search ................................ 324/207.12–207.25
See application file for complete search history.

(56) References Cited

U.S. PATENT DOCUMENTS 5,252,919 A * 10/1993 Uemura ................. 324/207.25

| | | | |
|---|---|---|---|
| 5,544,000 A | 8/1996 | Suzuki et al. | |
| 6,753,681 B2 * | 6/2004 | Enomoto et al. ....... | 324/207.25 |
| 7,210,451 B2 * | 5/2007 | Ikeda et al. .................. | 123/399 |
| 7,304,472 B2 * | 12/2007 | Ramsden ................ | 324/207.25 |
| 2002/0175676 A1 | 11/2002 | Pfaffenberger et al. | |
| 2004/0169503 A1* | 9/2004 | Enomoto et al. ......... | 324/207.2 |

FOREIGN PATENT DOCUMENTS

DE   195 03 335   12/1995
JP   3206204      7/2001

* cited by examiner

*Primary Examiner*—Jay M Patidar
(74) *Attorney, Agent, or Firm*—Nixon & Vanderhye PC

(57) ABSTRACT

A rotation angle detection device for detecting a rotation angle of an object has a substantially cylinder-shaped yoke, a magnetism generation unit which is fixed to an inner surface of the yoke, a magnetism detection member which is arranged substantially in a center axis of the yoke, at least one bearing which rotatably supports the yoke, and a support member which holds the bearing. The yoke is made of a magnetic metal, and fixedly mounted at the object to be rotatable integrally with the object. The magnetism generation unit generates a magnetic field substantially perpendicular to the center axis of the yoke. The magnetism detection member generates an output corresponding to a variation of the magnetic field to detect the rotation angle of the object relative to the magnetism detection member.

7 Claims, 6 Drawing Sheets

ROTATION ANGLE DETECTION DEVICE HAVING BEARING SUPPORTED YOKE FIXED TO OBJECT BEING DETECTED

CROSS REFERENCE TO RELATED APPLICATION

This application is based on a Japanese Patent Application No. 2005-326517 filed on Nov. 10, 2005, the disclosure of which is incorporated herein by reference.

FIELD OF THE INVENTION

The present invention relates to a rotation angle detection device, which can be suitably used to contactlessly detect a rotation angle of an object.

BACKGROUND OF THE INVENTION

Generally, a rotation angle detection device (e.g., accelerator pedal device) is provided with a rotation detection sensor which contactlessly detects a rotation angle of a detection object (e.g., accelerator pedal) rotatably supported by a support member. The rotation detection sensor has a permanent magnet for generating a parallel magnetic field, and a magnetism detection member which is fixed in the parallel magnetic field of the permanent magnet to generate output corresponding to magnetic lines of force.

As disclosed in US2002/0175676A1, referring to FIG. 4, an accelerator pedal device has a metal shaft S which supports the rotation of an accelerator pedal 3. A permanent magnet 7 and a magnetism detection member 8 are arranged separately from the shaft S. In this case, the permanent magnet 7 has a substantial fan shape in the rotation direction of the accelerator pedal 3. That is, the permanent magnet 7 is provided with a special shape, so that the manufacture cost of the permanent magnet 7 increases.

As disclosed in DE19503335, referring to FIG. 5, an accelerator pedal device is provide for the accelerator pedal 3 made of a resin. A basal portion 3a of the accelerator pedal 3 is rotatably supported around a bearing J which is made of a resin and has a cylinder shape. In this case, a rotation detection sensor 1 is arranged in the rotation-axis-direction vicinity of the bearing J.

Because the accelerator pedal 3 is depressed by a passenger foot, it is possible for a rough force is exerted thereto. Therefore, in the case where the accelerator pedal 3 made of the resin is supported by the bearing J made of the resin, the strength, the heat resistance and the durability to withstand the operation of the accelerator pedal device are unsatisfactory. Therefore, the wearing away at the resin-made rotation-sliding portion readily occurs during the long term use. Thus, the operation performance of the accelerator pedal 3 will be deteriorated.

As disclosed in U.S. Pat. No. 5,544,000 with reference to FIGS. 6-9, the rotation angle detection device is used as a throttle opening-degree sensor. In this case, the rotation detection sensor 1 is arranged at an end of the shaft S which is rotatably supported. In the case where this rotation angle detection device is suitably used for the accelerator pedal device, the rotation detection sensor 1 is to be arranged in the axial-direction vicinity of the shaft S with reference to FIG. 6.

In this case, when the shaft S is inclined as shown in FIG. 7, the attachment position of the permanent magnet 7 which is mounted to the end of the shaft S through the yoke 2 will vary. That is, the predetermined position of the permanent magnet 7 with respect to the magnetism detection member 8 is deviated. As a result, the magnetic flux applied to the magnetism detection member 8 is varied, thus deteriorating the detection accuracy of the rotation angle.

Moreover, as shown in FIG. 8, in the case where the attachment position of the yoke 2 is deviated in the diametrical direction of the shaft S with respect to the shaft S, the attachment position of the permanent magnet 7 will vary along with the yoke 2. That is, the predetermined position of the permanent magnet 7 with respect to the magnetism detection member 8 is deviated. As a result, the magnetic flux applied to the magnetism detection member 8 is varied, thus deteriorating the detection accuracy of the rotation angle.

Furthermore, as shown in FIG. 9, in the case where the yoke 2 is inclined with respect to the shaft S, the attachment position of the permanent magnet 7 will be deviated along with the yoke 2. That is, the predetermined position of the permanent magnet 7 with respect to the magnetism detection member 8 is deviated. As a result, the magnetic flux applied to the magnetism detection member 8 is varied, thus deteriorating the detection accuracy of the rotation angle.

SUMMARY OF THE INVENTION

In view of the above-described disadvantages, it is an object of the present invention to provide a rotation angle detection device, in which a durability of a portion for supporting a rotation of a detection object is improved and a deterioration of an detection accuracy of a rotation angle of the detection object is restricted even when the portion for supporting the rotation of the detection object is inclined.

According to the present invention, the rotation angle detection device for detecting a rotation angle of an object is provided with a substantially cylinder-shaped yoke which is made of a magnetic metal and fixedly mounted at the object to be rotatable integrally with the object, a magnetism generation unit which is fixedly mounted at an inner surface of the yoke and generates a magnetic field substantially perpendicular to a center axis of the yoke, a magnetism detection member which generates an output corresponding to a variation of the magnetic field to detect a relative rotation angle between the yoke and the magnetism detection member, at least one bearing which rotatably supports the yoke, and a support member which holds the bearing to rotatably support the object. The magnetism detection member is arranged at an inner side of the yoke and positioned substantially in the center axis of the yoke.

In this case, the detection object is integrated with the yoke, which is made of the magnetic metal and supported by the housing through the bearing 6. Therefore, even when at least one of the detection object and the support member is made of a resin, a long-term durability of the portion for supporting the rotation of the detection object can be maintained.

Moreover, the detection object is fixedly mounted at the yoke, without being fixedly mounted at a shaft as disclosed in the prior art. Thus, it is capable to restrict the deterioration of a detection accuracy of the rotation angle due to a deviation of the attachment position of the yoke with respect to the shaft.

Because the magnetism generation unit (e.g., permanent magnet) is fixed to the inner surface of the yoke to generate the magnetic flux at the inner side of the yoke, it becomes unnecessary to provide a special shape for the permanent magnet. Thus, the cost can be reduced. Moreover, the yoke is constructed of the magnetic metal, to construct a part of a magnetic path of the magnetic flux from the permanent magnet. Thus, the magnetic force of the permanent magnet can be strengthened. Because the yoke can function as a magnetic shield, the influence of the magnetic flux from the exterior on the magnetism detection member can be restricted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLE EMBODIMENTS

Preferred Embodiment

A rotation angle detection device for detecting a rotation angle of an object according to a preferred embodiment of the present invention will be described with reference to FIGS. 1A-3. For example, the rotation angle detection device can be suitably used as an accelerator pedal device for detecting a rotation angle of an accelerator pedal 3, which is rotatably supported and operated by a passenger foot or the like.

Figure 1A:
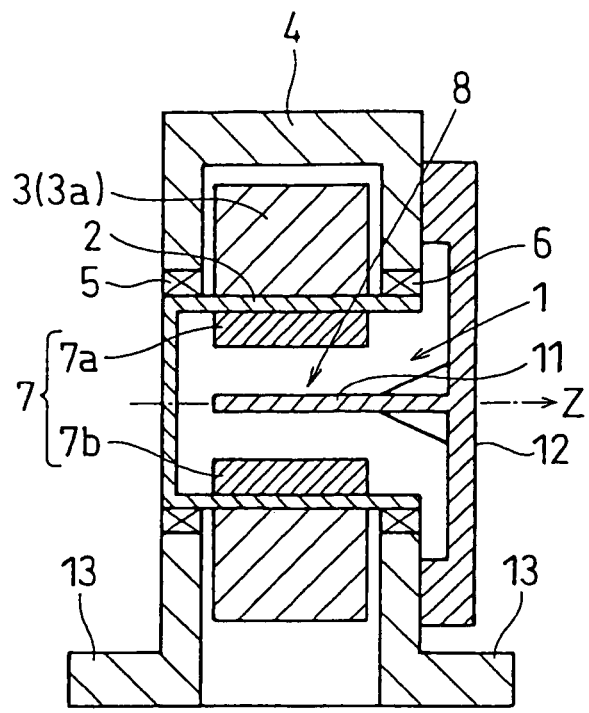
FIG. 1A is a cross sectional view which shows an accelerator pedal device and is taken along a rotation axis direction of the accelerator pedal device according to a preferred embodiment of the present invention.
Figure 1B:
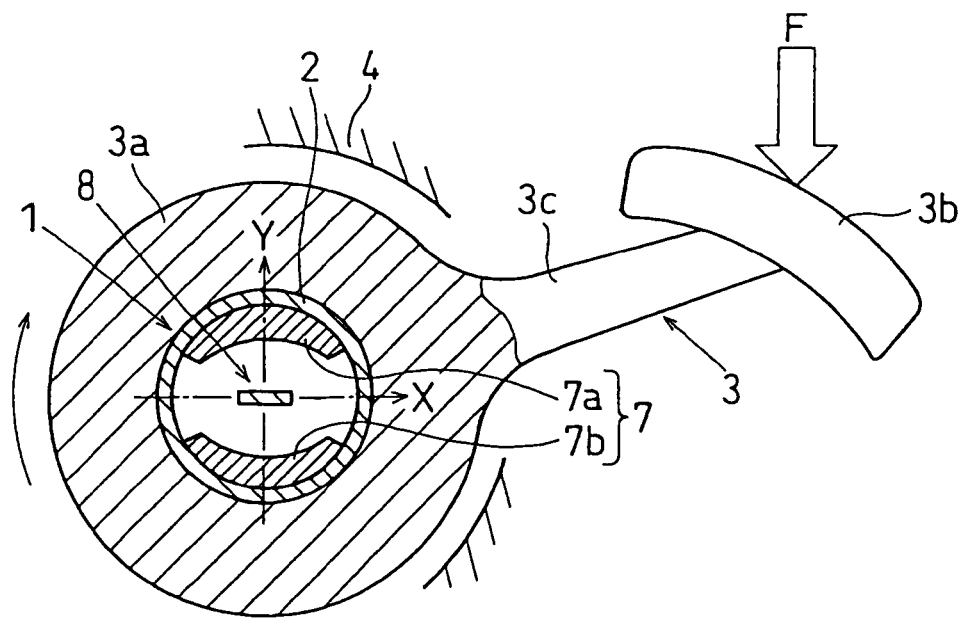
FIG. 1B is a partially sectional view showing the accelerator pedal device when being viewed in the rotation axis direction thereof according to the preferred embodiment.

As shown in FIGS. 1A and 1B, the accelerator pedal device has a rotation detection sensor 1 (of noncontact type, for example), the accelerator pedal 3, a housing 4 (i.e., support member), a first bearing 5, a second bearing 6, and a return spring (not shown). The rotation detection sensor 1 includes a yoke 2, a magnetism detection member 8, and a magnetism generation unit 7 (e.g., permanent magnet) which can be constructed of a magnetic-flux generating portion 7a and a magnetic-flux attracting portion 7b.

The yoke 2 can be made of a magnetic metal such as iron and the like, and rotatably supported with respect to the housing 4 through the first bearing 5 and the second bearing 6. That is, the first bearing 5 and the second bearing 6 are arranged between the yoke 2 and the housing 4.

The yoke 2 is hollowed to have a substantial cup shape, for example. In this case, the yoke 2 is bottomed at one axial-direction end thereof (i.e., left side in FIG. 1A), and is open at the other axial-direction end thereof (i.e., right side in FIG. 1A). The accelerator pedal 3 which is operated by the passenger foot or the like is fixed to an outer surface of the yoke 2 to be integrally rotated with the yoke 2.

In this embodiment, each of the magnetic-flux generating portion 7a and the magnetic-flux attracting portion 7b of the permanent magnet 7 has a substantial semi-cylinder shape (i.e., substantial arc shape). The magnetic-flux generating portion 7a and the magnetic-flux attracting portion 7b are fixed to an inner surface of the yoke 2 to face each other, to be rotatable integrally with the yoke 2.

Thus, the permanent magnet 7 is provided with a substantial cylinder shape which is divided in the circumferential direction thereof. The rotation axis of the permanent magnet 7 is substantially coaxial with the center axis of the permanent magnet 7.

In this case, as shown in FIG. 1B, two predetermined air gaps in the circumferential direction of the permanent magnet 7 are provided between the magnetic-flux generating portion 7a and the magnetic-flux attracting portion 7b. That is, each of the predetermined air gaps is positioned between one circumferential end of the magnetic-flux generating portion 7a and one circumferential end of the magnetic-flux attracting portion 7b. These circumferential ends face each other.

The magnetic-flux generating portion 7a generates the magnetic flux toward the magnetism detection member 8 which is arranged substantially in the rotation axis of the permanent magnet 7. The magnetic-flux attracting portion 7b attracts the magnetic flux generated by the magnetic-flux generating magnet portion 7a. That is, the inner surface of the magnetic-flux generating portion 7a has the polarity of a north pole (N pole), and the inner surface of the magnetic-flux attracting portion 7b has the polarity of a south pole (S pole). In this case, the magnetic flux (magnetic field) from the permanent magnet 7 is substantially perpendicular to the rotation axis of the permanent magnet 7.

The bearing 5, 6 can be made of a metal, for example. The bearing 5, 6 can be constructed of a thrust bearing, or a rolling-element bearing (such as ball bearing and roller bearing) or the like, to rotatably support the yoke 2. The bearings 5 and 6 are coaxially arranged. The permanent magnet 7 which is fixed to the inner surface of the yoke 2 is positioned between the first bearing 5 and the second bearing 6 in the center axis direction of the bearing 5, 6. Similarly, the accelerator pedal 3 which is fixed to the outer surface of the yoke 2 is also positioned between the first bearing 5 and the second bearing 6 in the center axis direction of the bearing 5, 6.

In this case, the rotation axis of the accelerator pedal 3 which is rotatable along with the yoke 2 substantially coincides with that of the permanent magnet 7 which is fixed to the inner surface of the yoke 2. That is, the yoke 2 is rotatably supported by the bearings 5 and 6, and positioned around the rotation axis of the accelerator pedal 3 and the permanent magnet 7.

The magnetism detection member 8 can be constructed of a Hall IC, for example. The Hall IC is a well-known integrated circuit in which a Hall element and a signal processing circuit are integrated. The Hall IC can output voltage signals, responding to the magnetic flux density in a direction perpendicular to a magnetism detection surface of the Hall element.

The magnetism detection member 8 can be molded in a sensing stick 11, which is inserted in the yoke 2 through the opening end of the yoke 2 and arranged in the rotation axis (i.e., Z-axis in FIG. 1A) of the yoke 2. Thus, the magnetism detection member 8 is positioned substantially at the center axis (i.e., rotation axis) of the yoke 2, to extend substantially in the center axis direction of the yoke 2. Thus, the magnetic-flux generating portion 7a and the magnetic-flux attracting portion 7b are spaced from the magnetism detection member 8 with a substantially same distance in the diametrical direction of the yoke 2.

The sensing stick 11 can be made of a resin (e.g., polyacetal resin and polyamide resin). The sensing stick 11 is integrated with a sensor cover 12, which is made of a resin or the like and fixed to a side surface of the housing 4. In this case, the sensor cover 12 is fixed to the housing 4, in such a manner that the magnetism detection member 8 molded in the sensing stick 11 is positioned in the center axis (i.e., rotation axis) of the yoke 2.

Thus, when the depression F is applied to the accelerator pedal 3, the accelerator pedal 3, the yoke 2 and the permanent magnet 7 will be rotated relatively to the magnetism detection member 8 which is fixed to the vehicle or the like through the housing 4.

Next, the operation of the rotation detection sensor 1 will be described. As shown in FIG. 1A, the rotation axis (in left-right direction in FIG. 1A) of the yoke 2 is indicated as the Z-axis. As shown in FIG. 1B, an antimagnetic direction (being impervious to effect of magnetic field) of the Hall element which is parallel to the magnetism detection surface of the Hall element is indicated as the X-axis (in left-right direction FIG. 1B), which is perpendicular to the Z-axis. As shown in FIG. 1B, the magnetism detection direction (which is perpendicular to magnetism detection surface) of the Hall element is indicated as the Y-axis (in up-down direction in FIG. 1B), which is perpendicular to the Z-axis and the X-axis.

Figure 2:
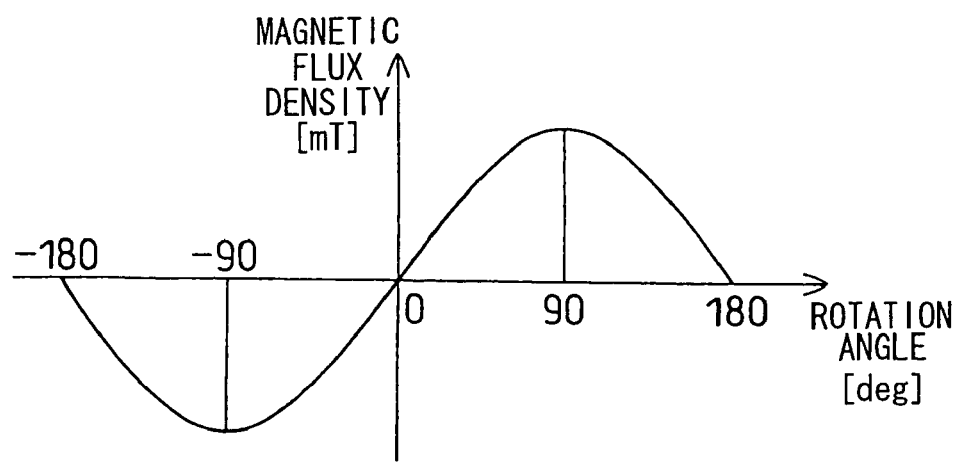
FIG. 2 is a graph showing a relationship between a magnetic flux density and a rotation angle according to the preferred embodiment.
Figure 3:
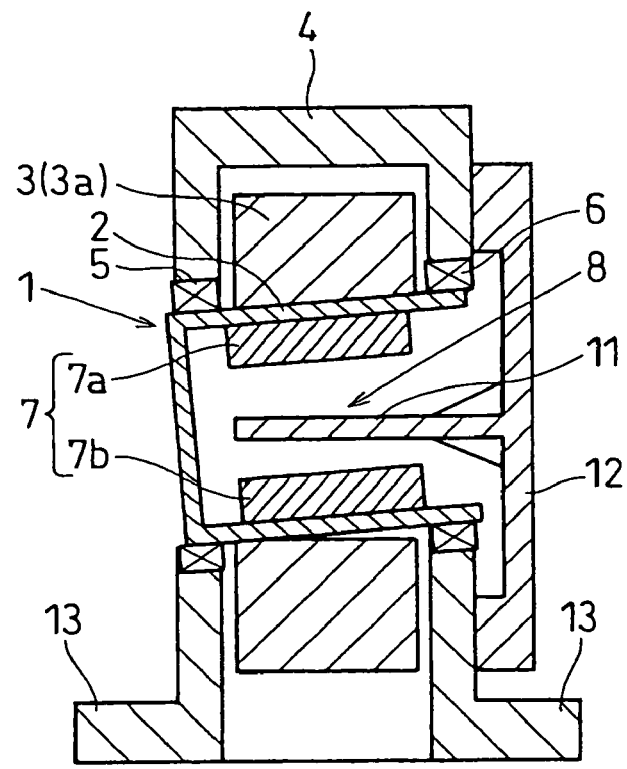
FIG. 3 is a cross sectional view which shows the accelerator pedal device and is taken along the rotation axis direction thereof in the case where a portion for supporting a rotation of an accelerator pedal is inclined according to the preferred embodiment.
Figure 4:
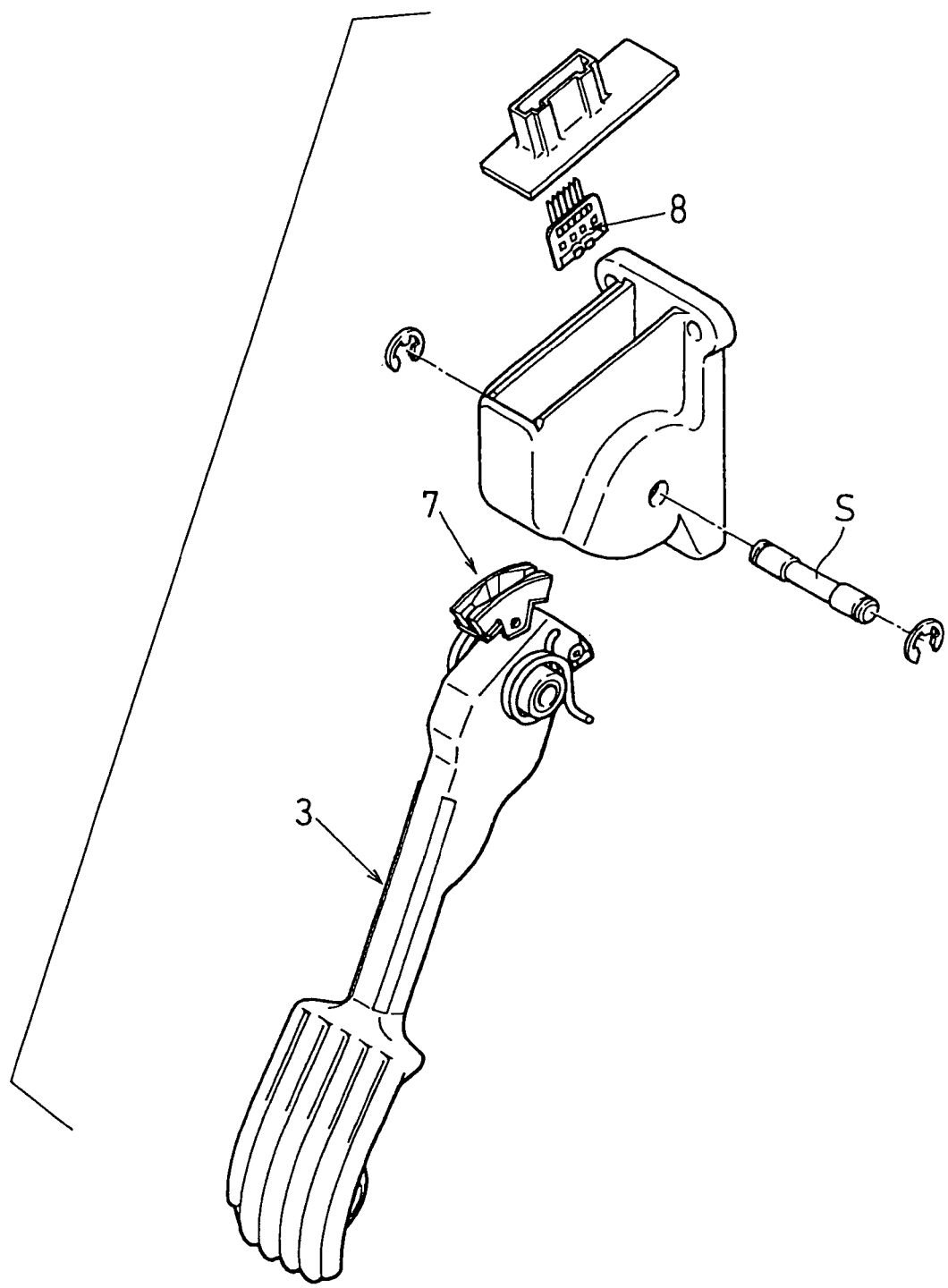
FIG. 4 is a disassembled perspective view showing an accelerator pedal device according to a first prior art.
Figure 5:
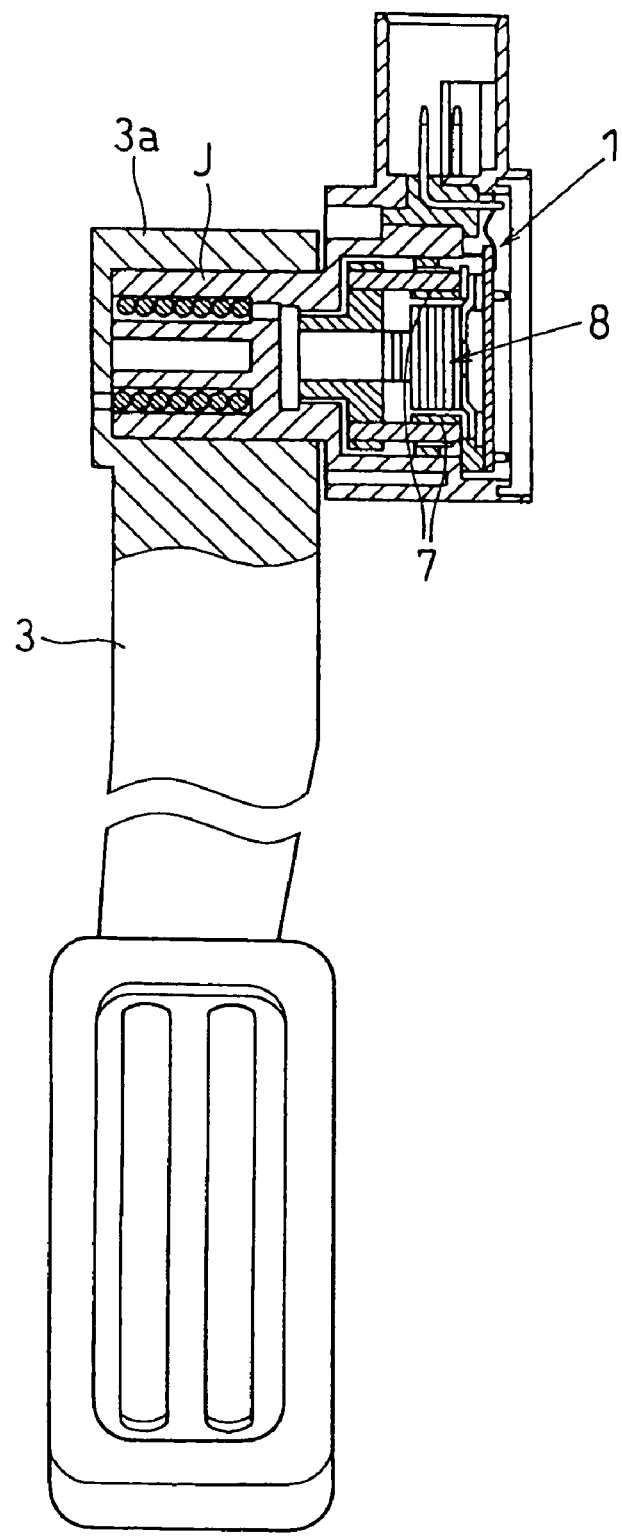
FIG. 5 is a partially sectional view which shows a accelerator pedal device and is taken along a rotation axis direction of the accelerator pedal device according to a second prior art.
Figure 6:
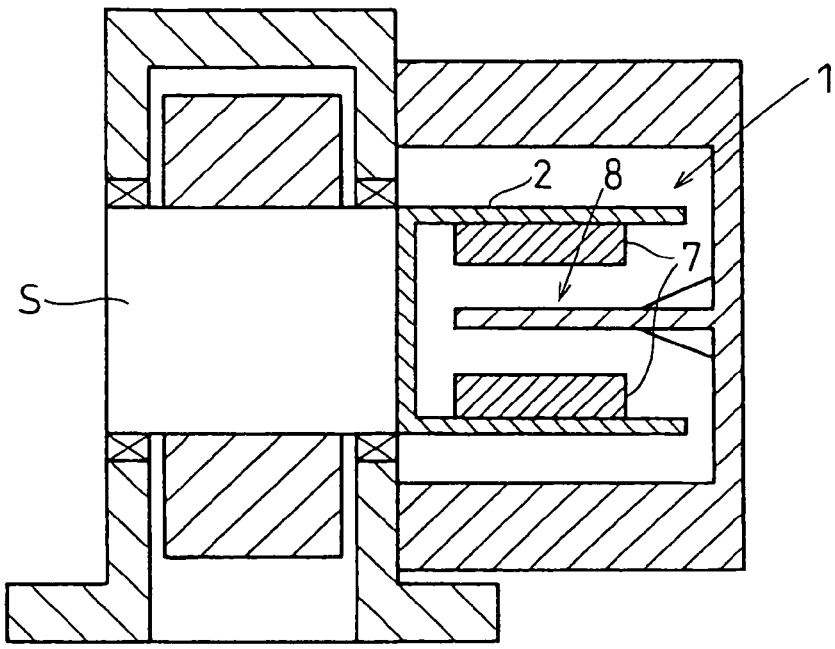
FIG. 6 is a cross sectional view which shows a accelerator pedal device and is taken along a rotation axis direction of the accelerator pedal device according to a third prior art.
Figure 7:
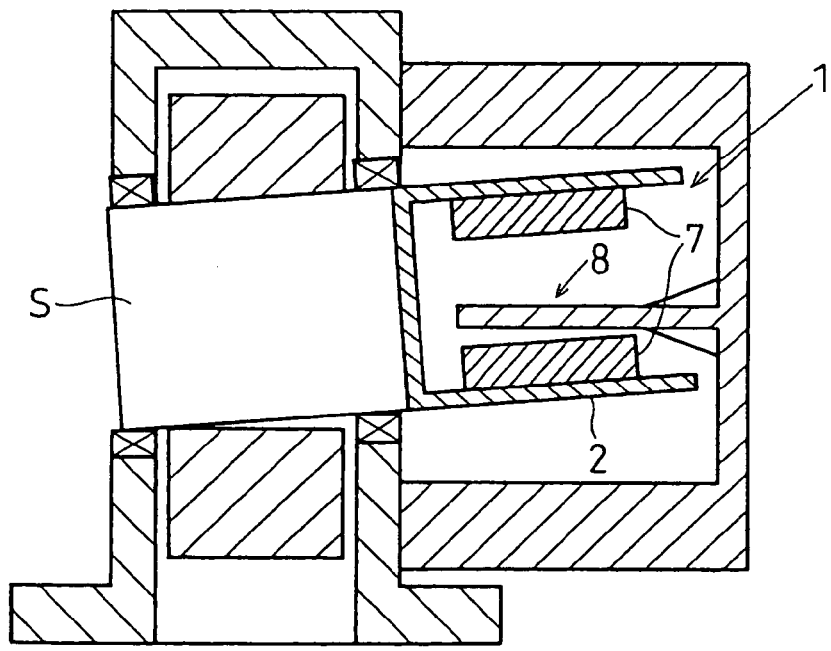
FIG. 7 is a cross sectional view which shows the accelerator pedal device and is taken along the rotation axis direction thereof in the case where a portion for supporting a rotation of an accelerator pedal is inclined according to the third prior art.
Figure 8:
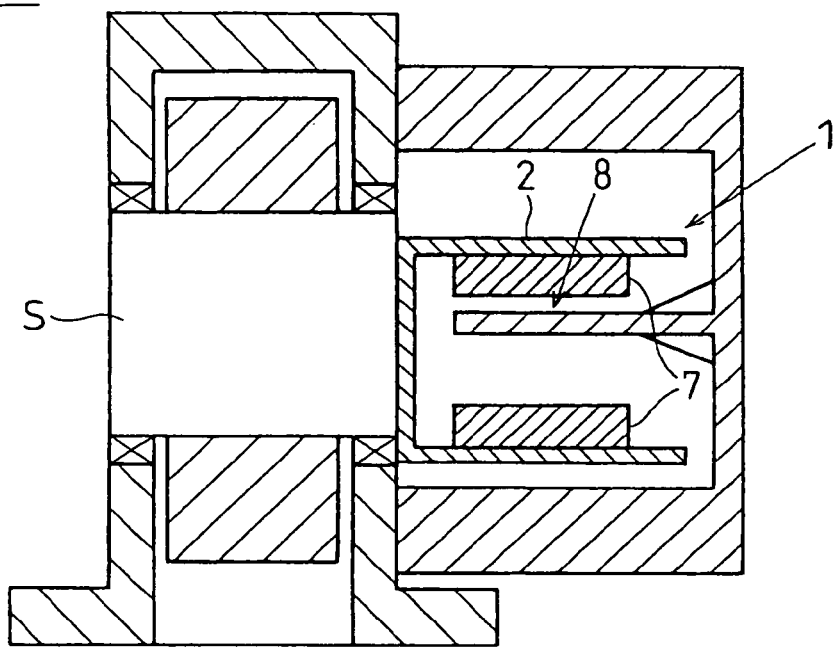
FIG. 8 is a cross sectional view which shows the accelerator pedal device and is taken along the rotation axis direction thereof in the case where an attachment position of a yoke is diametrically deviated with respect to the portion for supporting the rotation of the accelerator pedal according to the third prior art.
Figure 9:
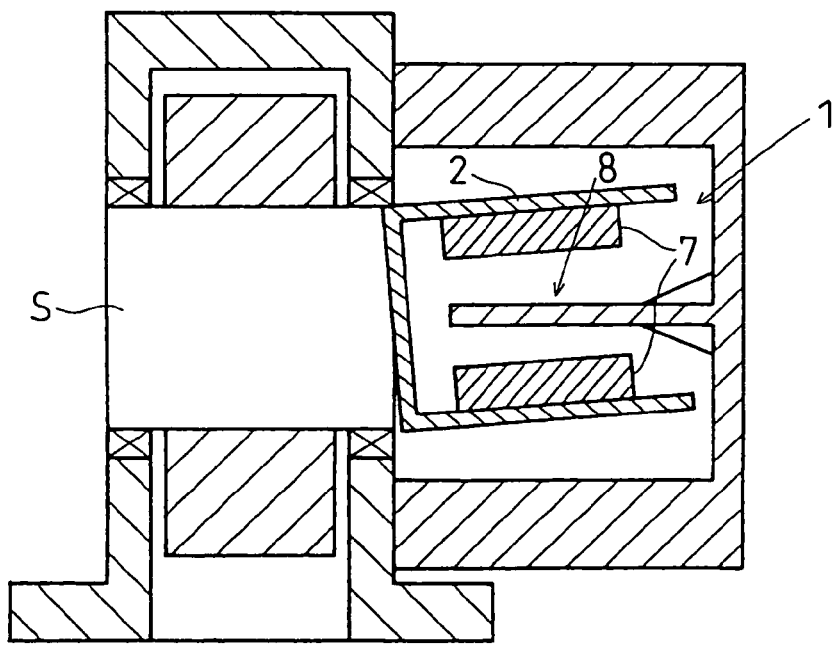
FIG. 9 is a cross sectional view which shows the accelerator pedal device and is taken along the rotation axis direction thereof in the case where the yoke is inclined with respect to the portion for supporting the rotation of the accelerator pedal according to the third prior art.

As shown in FIG. 2, the rotation angle of the yoke 2 is set as 0° when the middle portion (being in circumferential direction of permanent magnet 7) of the air gap between the magnetic-flux generating portion 7a and the magnetic-flux attracting portion 7b is positioned at the Y-axis. The rotation angle of the yoke 2 is set as 90° when the middle portion of the air gap between the magnetic-flux generating portion 7a and the magnetic-flux attracting portion 7b is positioned at the X-axis.

In this case, there exists at the inner side of the yoke 2a a magnetism circuit in which the magnetic flux flows. The magnetism circuit is constructed of the magnetic-flux generating magnet portion 7a, the magnetic-flux attracting portion 7b and the magnetism detection member 8. That is, the magnetic flux in the magnetism circuit flows from the magnetic-flux generating portion 7a through the magnetism detection member 8 (Hall IC) to the magnetic-flux attracting portion 7b. When the yoke 2 is rotated integrally with the detection object (e.g., accelerator pedal 3), the magnetic flux will vary.

As shown in FIG. 2, when the middle portion of the air gap between the magnetic-flux generating portion 7a and the magnetic-flux attracting portion 7b is positioned at the X-axis (that is, when rotation angle of yoke 2 is 90°), the density of the magnetic flux which is in a direction M perpendicular to the magnetism detection surface of the Hall element becomes substantial maximum.

When the rotation angle of the yoke 2 further increases from 90° or decreases from 90°, the magnetic flux which is perpendicular to the magnetism detection surface of the Hall element will reduce with the rotation angle varying.

In the case where the middle portion of the air gap between the magnetic-flux generating portion 7a and the magnetic-flux attracting portion 7b is positioned at the Y-axis (that is, when rotation angle of yoke 2 is 0°), the magnetism flux which is perpendicular to the magnetism detection surface of the Hall element becomes substantial zero.

Furthermore, when the yoke 2 is rotated from the position of the 0° rotation angle so that the rotation angle thereof has a negative value with reference to FIG. 2, the magnetic flux in a direction contrary to the direction M which is perpendicular to the magnetism detection surface of the Hall element increases with the rotation angle varying.

When the rotation angle of the yoke 2 becomes equal to −90°, the density of the magnetic flux in the direction contrary to the direction M which is perpendicular to the magnetism detection surface of the Hall element becomes substantial maximum.

When the rotation angle of the yoke 2 further varies toward a negative value side from −90°, the density of the magnetic flux in the direction contrary to the direction M which is perpendicular to the magnetism detection surface of the Hall element begins to reduce with the rotation angle varying.

The rotation angle of the yoke 2 corresponds to the rotation angle of the detection object such as the accelerator pedal 3 which is fixed to the yoke 2. The position (e.g., initial position) of the accelerator pedal 3 when having the rotation angle 0° can be used as a fiducial position for the detection of the rotation angle thereof, and can be arbitrarily set.

In this embodiment, the rotation angle detection device is suitably used to detect the rotation angle (i.e., relative rotation angle of yoke 2 to magnetism detection member 8) of the accelerator pedal 3 which can be made of a synthetic resin (e.g., polyacetal resin and polyamide resin). The accelerator pedal 3 can have a basal portion 3a which is integrated with the outer surface of the yoke 2 to be integrally rotatable along with the yoke 2, a pedal portion 3b where a depressing force F is applied by the passenger foot or the like, and a connection portion 3c (having an arm shape, for example) which connects the basal portion 3a with the pedal portion 3b. The basal portion 3a can have a substantially cylindrical shape.

In this case, the basal portion 3a is arranged between the first bearing 5 and the second bearing 6 in the center axial direction of the bearing 5 and 6. The depression force F which is applied to the accelerator pedal 3 can be transferred to the yoke 2 which is arranged between the first bearing 5 and the second bearing 6 in the center axial direction of the bearing 5, 6. That is, the depression force F applied to the accelerator pedal 3 is received by both the first bearing 5 and the second bearing 6.

In this case, the basal portion 3a and the connection portion 3c can be integrated with each other. The pedal portion 3b and the connection portion 3c can be also integrated with each other.

The accelerator pedal device is provided with the support member, for example, the housing 4 which is made of a synthetic resin (e.g., polyacetal resin and polyamide resin). The housing 4 is shaped to cover the basal portion 3a. For example, the housing 4 can be provided with a through hole, in which the yoke 2 is arranged. In this case, the basal portion 3a which is fixed to the outer surface of the yoke 2 and positioned between the bearings 5 and 6 in the center axis direction of the yoke 2 can be housed in a space formed in the housing 4. The center axis of the through hole of the housing 4 can be arranged coaxially with the yoke 2 and the bearings 5 and 6.

The housing 4 can be formed integrally with a flange 13, through which the housing 4 is mounted to a vehicle or the like. The flange 13 can be fixed to the vehicle or the like via a fastening unit such as a screw or the like, so that the rotation angle detection device (e.g., accelerator pedal device) is mounted to the vehicle.

The return spring can be constructed of a coil spring to return (twist) the accelerator pedal 3 toward the initial position thereof. Two ends of the return spring are respectively supported by the housing 4 and the accelerator pedal 3 in such a manner that a twisting force is retained in the return spring.

The accelerator pedal 3 is restricted by a stopper (not shown) so as to be capable of staying in a returning direction (restoring direction) of the twisting force which has been retained in the return spring. In the case where the depressing force F or the like is not exerted to the accelerator pedal 3, the accelerator pedal 3 will stay at the stop position thereof (i.e., initial position of accelerator pedal 3).

Next, the effects of the rotation angle detection device (e.g., accelerator pedal device) according to this embodiment will be described.

In this embodiment, the accelerator pedal 3, the housing 4, the sensing stick 11 and the sensor cover 12 are made of the resin, so that the weight of the accelerator pedal device can be reduced.

The accelerator pedal 3 is integrated with the yoke 2, which is made of the magnetic metal and supported by the housing 4 through the first bearing 5 and the second bearing 6. That is, the yoke 2 made of the magnetic metal also functions as a rotation support member of the accelerator pedal 3. Therefore, even when both the accelerator pedal 3 and the housing 4 are made of the resin, the long-term durability of the portion for supporting the rotation of the accelerator pedal 3 can be maintained.

The basal portion 3a of the accelerator pedal 3 is fixed to the yoke 2 and arranged between the bearings 5 and 6 in the center axial direction of the bearing 5, 6. Therefore, even when a complication force due to a rough operation or the like is applied to the accelerator pedal 3, the amplification of the complication force because of a lever action can be restricted. Therefore, it is capable of restricting the performance deterioration of the portion for supporting the rotation of the accelerator pedal 3 due to the complication force applied to the accelerator pedal 3.

According to this embodiment, the permanent magnet 7 (including magnetic-flux generating portion 7a and magnetic-flux attracting portion 7b) is fixed to the inner surface of the yoke 2 and positioned between the first bearing 5 and the second bearing 6 in the center axial direction of the bearing 5, 6. Thus, even when the yoke 2 is inclined due to a manufacture error or the like with reference to FIG. 3, a deviation of a predetermined position of the permanent magnet 7 with respect to the magnetism detection member 8 can be restricted. Thus, the deterioration of the detection accuracy of the rotation angle of the accelerator pedal 3 can be restricted.

Moreover, according to this embodiment, the accelerator pedal 3 is fixedly mounted at the yoke 2, without being fixedly mounted at a shaft as disclosed in the prior art. In this case, the deviation of the predetermined position of the permanent magnet 7 due to the incline or the like of the yoke 2 to the shaft can be restricted. It is capable to prevent the deterioration of the detection accuracy of the rotation angle of the accelerator pedal 3 due to a deviation (e.g., in diametrical direction) of the attachment position of the yoke 2 from the shaft.

Because the permanent magnet 7 is fixed to the inner surface of the yoke 2 to generate the magnetic flux at the inner side of the yoke 2, it becomes unnecessary to provide a special shape for the permanent magnet 7. That is, the permanent magnet 7 can be shared by, for example, a rotation sensor for detecting an opening degree of a throttle valve. That is, the permanent magnet 7 can double as the magnet used in the other rotation sensor. Therefore, the cost can be reduced.

In this embodiment, the yoke 2 is made of the magnetic metal, to construct a part of the magnetic path of the magnetic flux from the permanent magnet 7. Thus, the magnetic force of the permanent magnet 7 can be strengthened. Moreover, because the yoke 2 can function as a magnetic shield, the influence of the magnetic flux from the exterior on the magnetism detection member 8 can be restricted.

Other Embodiments

Although the present invention has been fully described in connection with the preferred embodiments thereof with reference to the accompanying drawings, it is to be noted that various changes and modifications will become apparent to those skilled in the art.

In the above-described embodiment, the magnetism detection member 8 which is constructed of the Hall IC is arranged in the yoke 2. However, the signal processing circuit of the Hall IC can be also arranged separately from the yoke 2, and only the Hall element is arranged inside the yoke 2. Moreover, other magnetism detection element such as a MR (magnetism resistance) element and the like can be also used as a substitute for the Hall element.

Furthermore, the rotation angle detection device can be also suitably used to detect a rotation angle of an object other than the accelerator pedal 3.

Such changes and modifications are to be understood as being in the scope of the present invention as defined by the appended claims.

What is claimed is:

1. A rotation angle detection device for detecting a rotation angle of an object, the rotation angle detection device comprising:

a yoke which has a substantially cylindrical shape and is made of a magnetic metal, the yoke being fixedly mounted at the object to be rotatable integrally with the object;

a magnetism generation unit which is fixedly mounted at an inner surface of the yoke and generates a magnetic field substantially perpendicular to a center axis of the yoke;

a magnetism detection member which generates an output corresponding to a variation of the magnetic field, to detect a relative rotation angle between the yoke and the magnetism detection member, the magnetism detection member being arranged at an inner side of the yoke and positioned substantially along the center axis of the yoke;

at least a first bearing and a second bearing which rotatably support the yoke; and a support member which holds the bearing to rotatably support the object, wherein:

the yoke is fixed to the object with an outer surface of the yoke contacting the object;

the yoke is rotatably supported by the first bearing and the second bearing; and the magnetism generation unit and the object are arranged between the first bearing and the second bearing in a rotation axis direction of the object.

2. The rotation angle detection device according to claim 1, wherein the magnetism generation unit includes: a magnetic-flux generating portion which generates magnetic flux; and a magnetic-flux attracting portion which attracts the magnetic flux generated by the magnetic-flux generating portion, wherein the magnetic-flux generating portion and the magnetic-flux attracting portion are fixed to the inner surface of the yoke and face each other.

3. The rotation angle detection device according to claim 1, wherein the object is an accelerator pedal which is made of a resin and operated by of a passenger in a vehicle.

4. The rotation angle detection device according to claim 3, wherein the support member is made of a resin.

5. The rotation angle detection device according to claim 1, wherein the first bearing and the second bearing are substantially coaxially arranged.

6. The rotation angle detection device according to claim 1, wherein the magnetism detection member is fixed to the support member.

7. The rotation angle detection device according to claim 1, wherein the magnetism generation unit is a permanent magnet.

* * * * *